United States Patent [19]
Carstensen et al.

[11] Patent Number: 5,895,079
[45] Date of Patent: Apr. 20, 1999

[54] THREADED CONNECTIONS UTILIZING COMPOSITE MATERIALS

[75] Inventors: Kenneth J. Carstensen, 1860 Whiteoak Dr., No. 211, Houston, Tex. 77009; Lawrence P. Moore, 48 Cascade Springs, The Woodlands, Tex. 77381; John P. Biro, Houston, Tex.

[73] Assignees: Kenneth J. Carstensen; Lawrence P. Moore, both of Houston, Tex.; John M. Hooks, Calgary, Canada

[21] Appl. No.: 08/604,180

[22] Filed: Feb. 21, 1996

[51] Int. Cl.$^6$ .................................................. F16L 15/04
[52] U.S. Cl. .................. 285/333; 285/334.2; 285/332.4; 285/370
[58] Field of Search ..................... 285/333, 334, 285/334.2, 332.4, 397, 370, 390, 355, 294.1, 294.2, 238, 334.4, 353

[56] References Cited

U.S. PATENT DOCUMENTS

| | | |
|---|---|---|
| 216,736 | 6/1879 | Hall . |
| 1,225,005 | 5/1917 | Boyd et al. . |
| 2,918,314 | 12/1959 | Kemnitz . |
| 2,943,967 | 7/1960 | Simon . |
| 3,856,906 | 12/1974 | Edgar . |
| 3,876,234 | 4/1975 | Harms . |
| 4,154,466 | 5/1979 | Simmons . |
| 4,317,693 | 3/1982 | Reed . |
| 4,428,602 | 1/1984 | Lambot et al. . |
| 4,548,428 | 10/1985 | Ruhle . |
| 4,943,094 | 7/1990 | Simmons . |
| 5,028,081 | 7/1991 | Fournier . |
| 5,351,752 | 10/1994 | Wood et al. . |
| 5,383,692 | 1/1995 | Watts . |
| 5,406,983 | 4/1995 | Chambers et al. . |

*Primary Examiner*—Heather Shackelford
*Attorney, Agent, or Firm*—Merchant, Gould, Smith, Edell, Welter & Schmidt

[57] ABSTRACT

For threaded connections for oil and gas applications using tubular goods of composite materials, substantially greater make up torque can be applied, with significantly improved tensile and sealing properties, by incorporating stress-relieving conical gradient sections adjacent each end of the threaded section of the composite member. Joining each of two composite tubular members to a single double ended male member having complementary surfaces, circumferential distortion is not concentrated at the end regions of the threaded sections but is distributed, relieving stresses and allowing increased makeup torque to be applied, greatly expanding the useful parameters of fiber reinforced tubular products.

37 Claims, 6 Drawing Sheets

Fig. 8.

¹ Tor=torque (ft lbs)  ² Reps = repeated cycles  ³ IP = internal pressure (psi)  ⁴ EP = external pressure (psi)
⁵ TS= tensile strength (lbs)  ⁶ Conv = conventional casing  ⁷ nt = torque not listed

| Sample | Box Feature | Pin Feature | Composite Feature | Tor¹ | Reps² | IP³ | EP⁴ | TS⁵ |
|---|---|---|---|---|---|---|---|---|
| Conv.⁶ | Std. API 2 7/8" 8 Rd EUE long, API Spec 5B, Table 2.6a | Std. API 2 7/8" 8 Rd EUE long, API Spec 5B, Table 2.6a | 60° hoop winds, 6° longitudinal winds, Cab-OSil tread paste, conventional head and tail build-up pressure | 210 | 4 | 6000 | 7600 | 54200 |
| 1 | Incorporate box-by-box design using two conventional boxes. Box faces, however, were face square in a frame | Steel pin-by-pin nipple of conventional AM 8 Rd design dimensioned with 51/2 turns of interference | Same as 1, above | 440 | 2 | 6000 | nt⁷ | nt |
| 2 | Same as 1, above | Same as 1, above | Placed low angle longitudinal windings on ID and OD of pipe, creating more stable column to address torque induced box-face to box-face compressive loads | 600 | 2 | nt | nt | nt |
| 3 | Incorporate steel ring between face to provide hard smooth surface against which both box-faces can ride under torque induced compression | Put O-ring on nose of steel pin for sealing security | Same as 2, above | 600 | 5 | nt | nt | nt |
| 4 | 5° taper on box recess area to unload and level complex forces induced on first several box threads | Cut corresponding 5° taper on nose pin with 0.008" interference per side | Wind additional high angle windings in box area to allow more hoop resistance to interference and allow more overall torque | 900 | 7 | 8500 | nt | nt |
| 5 | Put 10° taper on box small end ID dimensioned with interference relative to nose of pin | Cut corresponding 10° taper on nose pin with 0.003" interference per side | Same as 4, above | 1250 | 5 | 8500 | 11000 | nt |
| 6 | Incorporate precoated fiberglass fibers in thread fill paste to strengthen threads | Same as 5, above | Incorporate pre-coated fiberglass fibers in thread fill paste to strengthen threads in all respects | 1250 | 14 | 8500 | 11000 | 110000 |
| 7 | Same as 6, above | Same as 6, above | Change hoop winds to 51° and combine with OD 70° winds | 1250 | 14 | 8500 | 11000 | 110000 |

THREADED CONNECTIONS UTILIZING COMPOSITE MATERIALS

This invention relates to threaded tubular goods, such as pipe tubing and casings, and more particularly to threaded connections employing fiber reinforced composites in applications involving significant pressure or tensile loads.

BACKGROUND OF THE INVENTION

Many synthetic resin materials are now available for engineering applications and are widely used because of their particular advantages. Using such materials, products can be mass produced at relatively low cost for many uses, and the products are comparatively light weight, corrosion resistant, and can be designed to have very high strength. The structural characteristics of synthetic resin are enhanced by reinforcing with fibers, as in chopped, tow, roving, fabric or tape form, when forming composite or fiber reinforced plastic (FRP) bodies. Where the product shape needed is a closed surface, such as a tubular shape or a vessel, and when high force loading requirements must also be met, continuous filament winding is used. Continuous filaments of high tensile strength wound in predetermined patterns can achieve strength and stiffness properties along with strength to weight ratios that exceed conventional structural materials.

The advantages of FRP materials have not, however, been fully realized where threaded connections are employed because of both production and stress distribution problems. Use of the potential properties of filament wound reinforcement has often been limited by the fact that the geometrical discontinuities at the threads prevent optimum relationships from being achieved between filament orientation and the desired ratio of filament to resin matrix. Furthermore, while a female member can be wound on a male mold having a properly placed thread profile, fiber reinforced threads cannot be molded into the outside surface of a male member with comparable results. Instead, the thread profile must be cut into the outer surface, weakening thread strength and also creating surface irregularities which are incompatible with molded female thread surfaces.

There are a great many potential applications for FRP tubular products, which have in fact been used under specialized conditions in various industries for more than the past 40 years. Composites of these kinds have been used to a limited extent in the chemical and storage cavern industries, and to a greater but still minor extent in the pipeline industry, where usage has been in the range of 11% to 13% of total pipe consumed. The barriers have been the inability to contain internal pressures of the range of 3,000 psi and above, and premature degradation of the threads on repeated makeups and breakouts. The same factors have restricted use of composite pipe in drilled oil, gas and injection wells to a level of 3% to 5% of total pipe consumed. Where drilling is to be done, FRP pipe with sufficiently robust connections can be used if the force loading is light, as in workover drilling.

To obtain proper sealing against high internal pressures (e.g. greater than 3,000 psi), male and female threaded members must be engaged with a high level of torque to achieve high surface bearing pressure. In the prior art, however, this deforms the FRP pipe such that it either cracks or internally "leaks between layers" (delaminates). In addition, where the male threads have been cut into the FRP part, they deny the benefits of the reinforcement and leave filament ends flush at the surface. With wear or high bearing pressure these filament ends form highly frictional cutting points. On makeup and breakout the threads are quickly worn and galled, and breakout becomes increasingly more difficult.

In consequence, when FRP pipe is used, the makeup torque for a given pipe has been confined only to a low range (280–300 ft. lbs. for 2-⅞" pipe, for example). This means that only a comparably low level of bearing pressure can be established when makeup is completed, and thus only low internal pressures, temperature cycles, and tensile loads can be withstood. Consequently, those many industries which can potentially use FRP tubular goods have not been able to rely on them except for low pressure and low duty cycle situations. This includes not only drilled well and down hole applications and workover situations, but also secondary recovery uses, the deep well disposal industry for hazardous materials and pipeline applications.

In the oil industry, defined physical standards for tubular goods for down-hole and horizontal applications have been observed for many years, primarily with respect to threaded steel pipe. Thread profiles, material grades and thicknesses, tapers and other properties have been established for threaded tubular goods by the American Petroleum Institute (API) in accordance with the tensile forces and pressures that must be met for a particular installation. The female member is usually referred to as the "box" and the male member is usually referred to as the "pin". With many API connections, the box is an exterior collar for receiving pins from opposite ends. In oil field parlance, smaller diameter tubular goods are referred to as "tubing" and larger diameter down-hole tubular goods are referred to as "casings".

In assembly of a pipe string for a conventional down-hole installation a length (typically 30 feet, about 9 meters) of a tubing is added (stabbed) into the open upper end of a collar on the upper end of the immediately prior pipe length. The new pipe is threaded into place, until a predetermined range of thread interference, and consequently surface bearing pressure, has been reached. This range is generally established in practice by rotating the newly added pipe length for a predetermined number of turns after initial firm contact (the so-called "hand-tight plane") or until a measured or estimated level of makeup torque has been applied. As more torque is applied, the box is increasingly stressed circumferentially, while the pin is compressed. The amount of deformation locally varies because of relative differences in wall thickness along the length of the threaded region. However, as stress is increased, the deformations tend to increase as well (although not precisely linearly) along the threaded length, as long as the stresses are within the elastic limit of the materials. Where one member ends and the other is continuous, however, the stress level variations become significantly non-linear. In FRP tubular products, these variations are more than twice as steep as those observed with steel.

In view of the fact that male threads in an FRP member are not fully compatible with molded and reinforced female threads, workers in the art have used double ended steel pins or nipples to interconnect two abutting and internally threaded boxes. In this configuration, the deformation is taken up essentially entirely in the FRP member, which therefore must absorb the forces of make-up torque before failure. Existing connections of this type fail at levels which compare very unfavorably with steel tubing connections, in which the torque that can be applied is orders of magnitude greater. The industry has been searching for configurations which will accept substantially higher makeup torques and which will, in the field, indefinitely withstand internal pressures of 5,000 psi and greater. It is known from finite element analyses for steel, and observed failure patterns, that the stresses are highest at the region adjacent to the end of the box, because in this region the threads of the box are most often destroyed or the box itself tends to rupture or delaminate. Resolutions for those problems have not heretofore been found.

SUMMARY OF THE INVENTION

By minimizing stress discontinuities, without reducing other physical properties, apparatus and methods in accordance with the invention enable male and female members to be threaded together with substantially greater torque than has heretofore been attainable without failure. Sealing and other properties are therefore improved to levels at which the tubular goods can be used in situations not previously accessible.

As one example, a tubular threaded connection utilizing a combination of female tubular goods and male interconnecting members incorporate mating threaded areas on the male and female members. The male member is double ended to receive female members from each side. Adjacent each end of the threaded regions, low angle, conical gradient surfaces on both members reduce the localized deformation forces in the composite material so as to eliminate stress risers at the ends of the threaded regions. The length of and degree of interference between the engaging conical surfaces are selected relative to the thread interference to provide the desired result when the connection is fully made up. With such relationships, make-up torque on FRP boxes can be increased to a level more than 5–6 times greater than that which has heretofore been achievable, providing tensile and sealing properties which open a wide range of new applications to composite materials.

The advantages of this arrangement are best realized for most current needs by a steel male member and FRP female members. Although the composites in this combination undergo almost all the ensuing deformation when the needed bearing pressure level is reached, internal pressures of 5,000 psi or more are effectively sealed, and the connection can be made up and broken out numerous times while maintaining thread integrity. The same principles can, however, also be used with benefit in connections that are entirely of composite materials. The male thread profiles need not be cut but can be in the form of a hardened molded or steel insert. With such a feature to prevent galling, the tubular members can be directly threaded together in end to end relation for some applications.

Further in accordance with the invention, the FRP boxes are configured with diverging, internally threaded ends of substantially uniform wall thickness. The double-ended pin member is in the form of a pair of oppositely extending threaded nipples and incorporates a central crest portion with conical gradient surfaces on each side leading to a central flat. The pin member also includes an O-ring groove in each conical gradient surface adjacent the pin nose end for sealing the thread engagement region from internal pressures with an inserted O-ring. Flat ends of the FRP boxes engage the broad side faces of a radial ring disposed about the central flat on the pin. When the connection is fully made up, a substantial amount of makeup torque is absorbed in axial compression. This face to face contact under high compressive forces additionally seals against external pressure. A consequence of this approach is that the diverging end portions of the boxes are subjected to expanding hoop forces when the box and faces are compressively stressed. This would tend to decrease the interference stresses in the threads and the conical gradient surface because of radial spreading, but such effects are counterbalanced by winding the filaments so as to increase columnar strength. The metal faces also prevent surface abrasion from fiber ends from dramatically increasing friction due to interactions with the composite material surfaces. Consequently, a number of features contribute cumulatively to sealing, including interference in the thread region, interference in the conical stress gradient surfaces at each end of the threaded region, the O-rings, and the axial contact between the nose end of the pipes and the central radial ring.

A further advantage of this arrangement is that the tapers at each end of the pin are in the regions of smallest wall thickness of the pin. Any internal fluid pressure that tends to deform the pin ends and O-rings outwardly toward the surrounding boxes helps to increase bearing pressure and maintain the seal relationship. In addition, for corrosion resistance the pin can be of non-corrosive material or the interior surface of the pin can be coated with corrosion-resistant synthetic throughout its interior and around the end to the O-rings.

Also in accordance with the invention, all-FRP connections can be torqued to higher levels than heretofore by using conical gradient rings to provide stress relief adjacent each end of the threaded regions. The problems introduced by male thread profiles cut into FRP members can be reduced by use of molded thread inserts of solid high strength synthetic or metal inserts or surfaces. Nose end seal rings can be of elastomeric or metal or of layered laminates. These features may be used in direct box-to-box connections which may be of constant diameter or may be of upset configuration for greater wall thickness in the thread and shoulder regions.

BRIEF DESCRIPTION OF THE DRAWINGS

A better understanding of the invention will be had by reference to the following description, taken in conjunction with the accompanying drawings, in which:

FIG. 8 is a table of test results for connections with FRP boxes and steel pins.

DETAILED DESCRIPTION OF THE INVENTION

Figure 1:
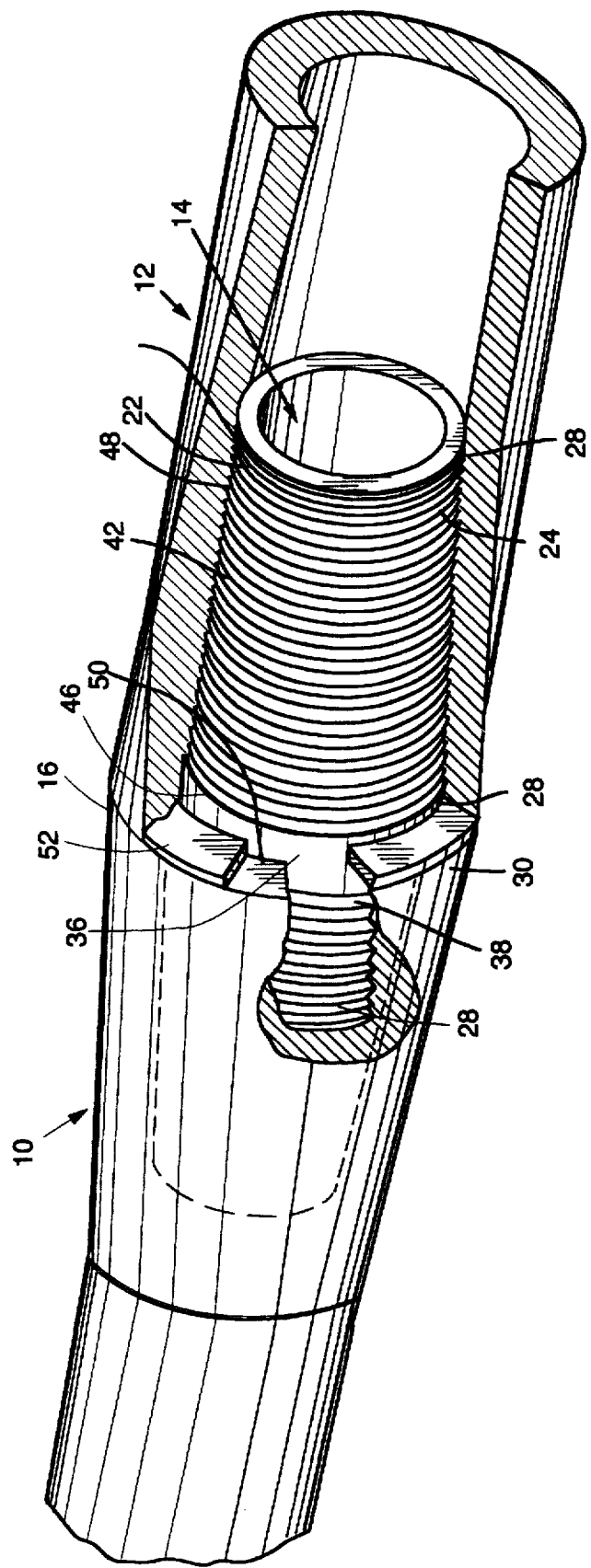
FIG. 1 is a perspective view, partially broken away, of a connection for joining two lengths of tubular product of composite materials.
Figure 2:
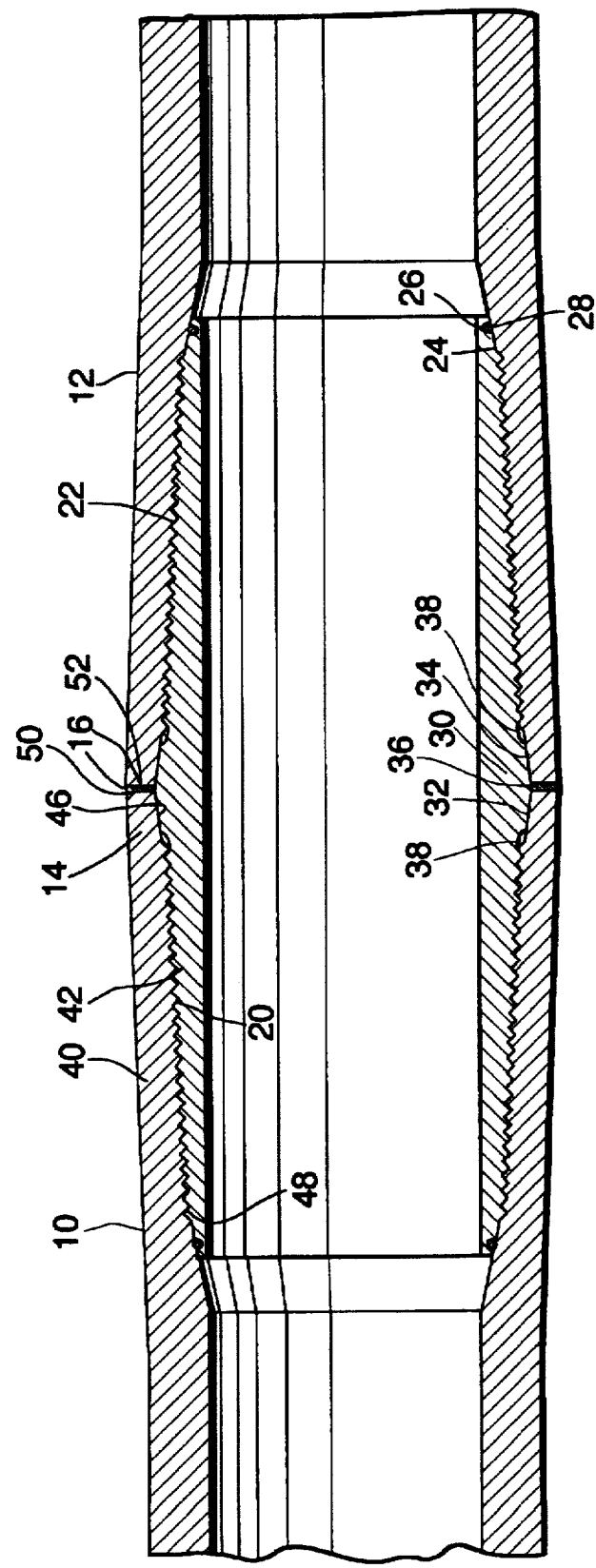
FIG. 2 is a side sectional view of the arrangement of FIG. 1.
Figure 3:
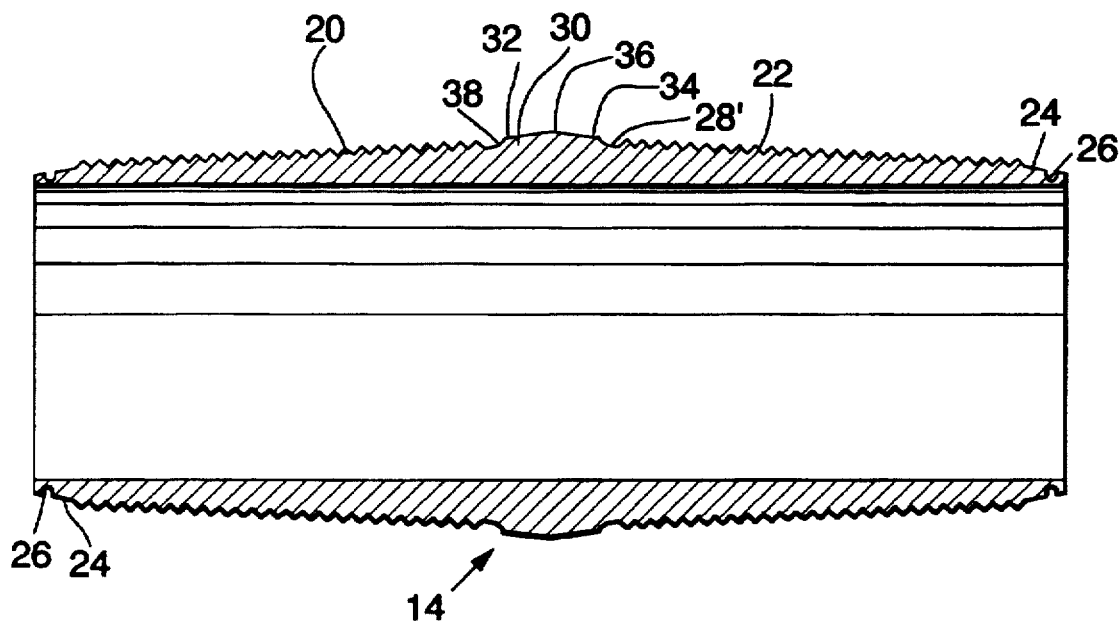
FIG. 3 is a side sectional view of a double ended male member utilized in the combination of FIGS. 1 and 2.
Figure 4:
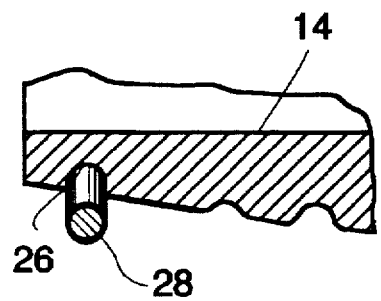
FIG. 4 is a side sectional view of a fragment of the male member of FIG. 2 showing the O-ring used therein.

As shown in FIGS. 1 to 3, a connection in accordance with the invention comprises first and second female members or boxes, 10, 12, respectively, of composite FRP construction. Typically, these composites comprise continuous reinforcing filaments of properties chosen for cost and strength. The usual filamentary reinforcement is glass fibers, although carbon, graphite, Kevlar, boron and other filamentary reinforcements may be employed.

With FRP tubular products, a box is usually formed on a male mandrel, wrapping a continuous filament coated with resin in a "B" (partially cured) stage on a male mandrel which has thread forms at each end. The processes are carried out with a winding machine that lays up the filaments with both circumferential and axial patterns, although winding in the immediate thread region is circumferential in order to have continuous filaments extending through the thread profiles. The female members 10, 12 are wound to a desired thickness, and thereafter fully cured by a known conventional technique, such as catalytic reaction at an adequate desired temperature, ultra violet radiation, or infrared heating. The matrix in the composites is typically epoxy, vinyl esters, poly esters, Furan or mixtures thereof, although a wide variety of other resins is also available.

The male member in the connection is an internal double ended pin or nipple 14, usually of steel or an alloy. Since FRP tubular goods are usually employed for their corrosion resistance, the pin 14 also may be of a typical corrosion resistant material well known to those skilled in the art. The material may be of the class of corrosion resistant materials and including Inconel, titanium, stainless steel, and API corrosion resistant alloys such as 9 chrome, 11 chrome, 13 chrome, 17 chrome and 2205 chrome, or other suitable metals. Alternatively, the pin 14 may be coated on all of its internal surfaces with a known corrosion resistant layer of one of the synthetic resin (e.g. Viton), epoxy and phenolic types now widely used in the oil and gas industry. This layer preferably covers the end of the pin 14 and the outer diameter to near the threaded region. The combination is completed by a steel center radial ring 16 having broad side face disposed between the facing surfaces of the first and second boxes 10, 12.

The pin 14 has a constant inner diameter matching that of the inner diameter along the length of the boxes 10, 12. Threaded sections 20, 22 on the outer surface of the pin 14 diverge oppositely from the nose ends toward the central region of the pin 14. The two threaded sections 20, 22 of the pin lie along the taper angles, and the thread profiles are substantially uniform except at the end of the threaded segments.

Only one side of the pin 14 need be described because the pin is arranged symmetrically about the center. For convenience the different features will be described with respect to the "outer" or "nose" end and the "inner" or "central" end of a half of the pin. Adjacent the nose end, the pin 14 includes an O-ring groove 26 in which is seated an O-ring 28, which engages the associated box to provide a substantial degree of sealing against leakage from internal pressure. Between the nose end and the principal length of the pin threads 20, thread crests are truncated to define a conical stress gradient or ring section 24. The angle of the surface of the conical section 24 relative to the taper of the thread section 20 itself is in the range of 5° to 20°, being 10° in the present example.

At the inner end of the thread section 20, in the central region of the pin 14, is a central crest ring 30 defined by oppositely tapered inner conical stress gradient or ring sections 32, 34. These tapered sections 32, 34 are separated by a thin center flat 36 approximately corresponding in width to the thickness of the center radial ring 16. The tapers of the two inner conical gradient sections 32, 34 are again in the range of 2° to 20° and in this example are 5° relative to the taper of the associated thread sections 20 or 22. For most designs, the tapered conical sections 20, 32, 34 will lie at angles of 5° to 15° relative to the tapers of the threaded sections. Between the crest ring 30 and the inner end of the thread section 20 is a machining relief groove 38 employed for practical reasons. In fabrication of the pin 14, the presence of such a groove enables completion of the last thread without chip or spur accumulation.

The female members or boxes 10, 12 are again alike, and the following description of one female member or box suffices for the other as well. The terminal length of the body of each box diverges on a taper substantially matching that of the outer taper of the associated half of the pin 14. The diverging section 40 is built up in a continuous process with the constant diameter control portion of a box 10 or 12, and is of substantial thickness along the length of its internally threaded region 42 when formed on a male mold. Because of the winding and curing process, however, wall thickness may diminish slightly toward the end of the box, although being only slightly thinner along the threads than in the constant diameter principal length of the box. Conical stress gradient or ring surfaces 46, 48 will be referred to as the interior conical surface 46 and the end conical surface 48 respectively. These surfaces 46, 48 match, in taper angle, the outer section 24 and the inner conical section 32 of the pin 14, respectively, in complementary fashion, being sized both axially and diametrically to establish desired levels of interference and stress when the connection is fully made up.

As shown in FIG. 2, when the unit is fully assembled, the end faces 50, 52 of the boxes 10, 12, respectively, abut the broad side faces of the center radial ring 16. The tapers at the outer diameter along the length of the pin 14 are angled to merge into the constant inner diameter of the boxes, leaving only a slight discontinuity. The pin nose end can in some instances engage an inner shoulder in the box to eliminate discontinuities altogether. However, unless the shoulder and the nose end are of adequate radial dimension, makeup torque used in this configuration will be so high as to destroy the shoulder.

Figure 7:
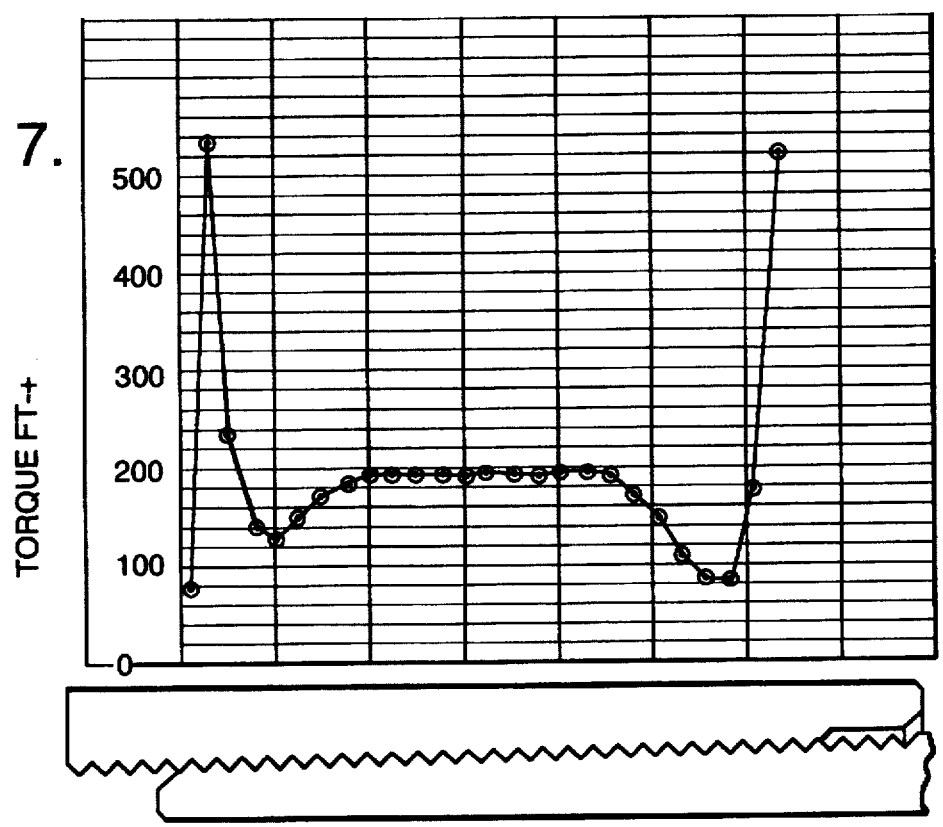
FIG. 7 is a graphical representation of the results of a finite element analysis for a threaded connection.

Significant advantages are derived from this configuration, beginning with the fact that a much higher range of makeup torque can be applied before box failure occurs. As thread engagement increases, stresses result in deformation of the composite member, ultimately to the point of failure, because the metal male member is much less yielding. Box failure tends to occur at the limits of the threaded region, or in end threads, circumferential deformation in the thread region is relatively uniform, but that beyond the end of the threads, the wall seeks to return to its original size, necking down and non-linearly increasing the local stresses. Study of the problem led to a finite element analysis of torque distribution in a steel connection, as depicted graphically in FIG. 7. A finite element analysis of an FRP structure is inordinately difficult, because the computation of the stresses in differently wound multiple filaments within a physically restraining matrix is difficult to specify, let alone implement. However, threaded steel members that form a connection that is of like configuration can more readily be analyzed, because steel is a homogeneous material, and the results of this analysis are applicable and instructive as to FRP structures. As seen in FIG. 7, torque demands and resultant deformation increase very sharply adjacent each end of a threaded region, and rise to a peak before dropping off at some distance from the end of the threaded section. The peak values each absorb about 10% of the total, the remainder being distributed across the threads.

This confirms why box failure occurs in the last threads, or at the box end, especially if the taper of the threaded section reduces wall thickness.

The lengths and interference between the engaging conical gradient surface are selected relative to the thread interference when the connection is fully made up. Along the length of the threads (see FIG. 7 as an example), the torque that is absorbed is substantially level, thread by thread, in the midregion and the stress is therefore also substantially level. At the end threads, the necking down phenomenon that occurs outside the thread region introduces a substantial stress riser. The interfering conical gradient sections absorb a part of the stress by limiting the adjacent deformation as full engagement is approached and reached. While this is achieved by angle and diameter selection, the length of a conical gradient section is also important. If too short, it provides little stress distribution and if too long, it serves more as a seal than a stress gradient distributor.

In contrast, combinations in accordance with the present invention can withstand makeup torques at least five times greater than heretofore recognized as a limit. For 2-⅞" (7.3 cm) round, for example, a practical limit of 220–300 ft. lbs. (about 30–46 kg-meters) has been regarded as the stress boundary. In accordance with the invention, however, as much as 1,250 ft. lbs. (about 395 kg-meters) of torque have been applied. When a connection is made between male and female members arranged in accordance with the present invention, and the bearing members are threaded together, the increased bearing surface engagement at the threads increases the necessary makeup torque. When the position is reached at which the tapered sealing ring sections at each end of the threaded regions come into contact, makeup torque is further increased, beyond that required for thread engagement. Because of the greater tapers of the conical gradient surfaces or rings, they take up increasing amounts of torque, in relation to torque required for the thread engagement region. The angles of the conical surfaces, relative to the thread tapers, thus introduce a gradual but increasing outward deformation that resists the "necking down" tendency in the box members, allowing greater makeup torque before failure occurs. A further important loading force is the engagement, at final closure, between the flat ends of the boxes and the central radial ring about the pin member. This is estimated to provide a sealing pressure in the range of 10,000 psi on each face.

With the diverging end portions of the boxes under axial compression of substantial magnitude, the tendency is for the diverging lengths to expand radially as face-to-face contact with the center ring increases. The consequence would be a tendency to reduce thread interfere and conical gradient surface interference, especially close to the box end. However, winding the filaments at low angles to increase columnar strength in the diverging sections counteracts this effect, keeping the stresses in the chosen range.

The cumulative benefits of features in accordance with the invention are depicted in the sample tests reported in the Table of FIG. 8. In the conventional sample, at the top row, torque is limited to 210 ft. lbs. and internal pressure to 6,000 psi over 4 repetitions. Placing the box ends in face to face relation, under axial compressive load, the applicable torque reached 440 ft. lbs. However, by winding the boxes to include low angle filament components on ID and OD for greater columnar stiffness (sample 2), a torque increase to 600 ft. lbs. was achieved. With the insertion of a radial steel ring between the box faces (sample 3) and an O-ring, there is an increase in the number of repetitions attainable. With this configuration, the addition of a 5° sealing ring adjacent the pin center and end of the boxes (sample 4), and further high angle filament windings for greater hoop strength, makeup torque is increased to 900 ft. lbs. and an internal pressure of 8,500 psi is withstood for 7 cycles. In sample 5, the addition of the 10° tapers on the nose ends of the pin and the inner ends of the boxes gives a makeup torque reaching 1,250 ft. lbs., capable of confining up to 9,750 psi internal pressure as confirmed by tests.

Further increases in properties are achieved (sample 6) by putting a thread fill paste on the threads, especially one with fine chopped fiber reinforcement. This assists sealing without diminishing makeup torque, with the fibers acting as a thixotropic or thickening agent which assures more uniform coverage of the thread surface.

Thus, the cumulative effect of the various sealing features that are utilized aids in assured resistance to internal pressure, so that for the first time FRP tubular goods can be utilized at guaranteed pressures of 5,000 psi or greater. This is assured because of substantial repetitions of pressure cycles at 8,500 psi or greater internal pressure without failure. The thread engagement along the length of the threaded sections, of course, provides a primary barrier. In addition, the O-ring at each end, within the end conical surface region, further introduces a meaningful barrier. The limiting position defined by the box end engagement against the radial ring adds the high face-to-face pressure that aids sealing against both internal and external pressures.

Those skilled in the art will recognize that although API round threads are used, other thread types, including buttress threads, may be utilized. Also, the same arrangement can be used with different taper angles, and with buttress-type threads as well as round threads, and different lengths of taper. An internal shoulder for providing a flush central bore along the tubing or casing string can be used to eliminate internal turbulence and reduce sealing requirements. Where external pressures are the primary factor, such a shoulder configuration, which adds to required wall thickness, will not be needed.

The length and angle of taper can be varied dependent upon the characteristics of the composite as well as the needs of the particular application. However, it is preferred that the wall thickness of the divergent portion of the tubing or casing be substantially constant, at least in the region of the threaded section, to achieve the high levels of makeup torque that are attainable with the invention. Thread winding patterns for both columnar strength and resistance against hoop stresses enable the makeup torque to be absorbed. The central radial ring, together with the abutting end faces of the boxes, contributes substantially to effective sealing, and also provides a smooth surface resistant to abrasion by fibers interior to the matrix, since direct contact between composite surfaces results in surface irregularities that create extremely high friction and introduce wear that limit the reuse of the tubing or casing. Alternative engineering plastics can be used for such applications, however.

Figure 5:
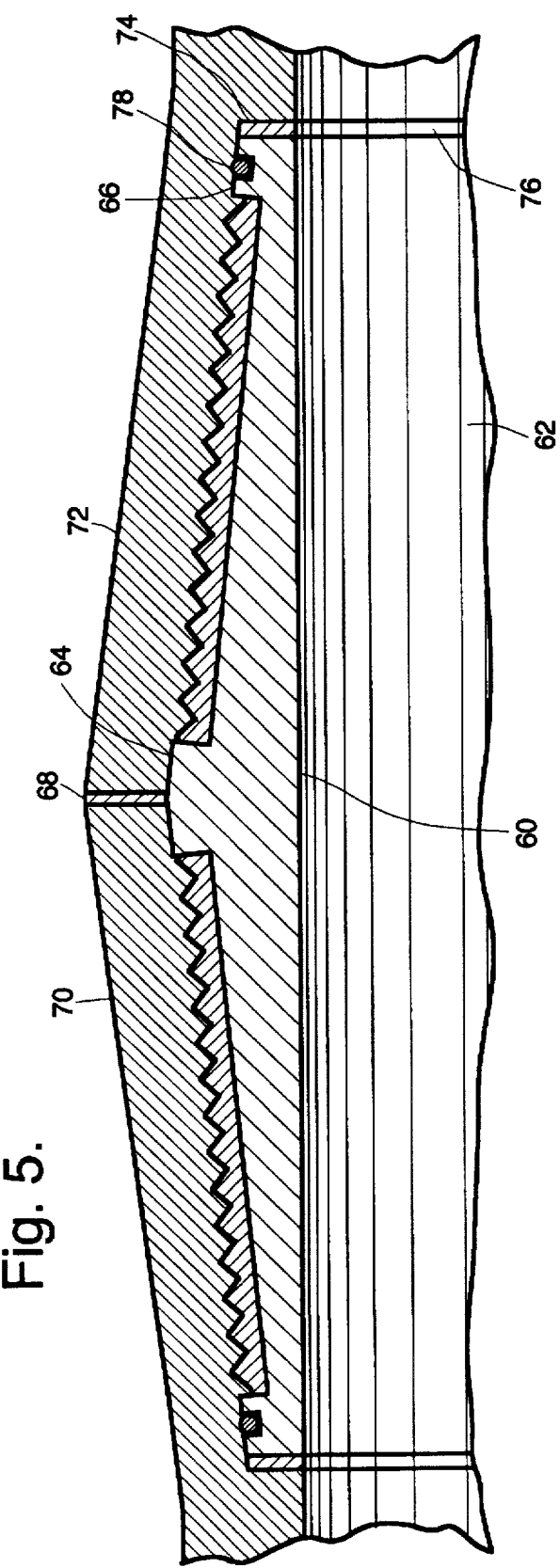
FIG. 5 is a side sectional view of a connection in which male and female members are both of fiber reinforced plastic.

Referring now to FIG. 5, a cross-sectional view of an all-FRP connection, a construction similar to that of FIGS. 1 to 4 is utilized to advantage even though the results are below those attainable with the arrangement of FIGS. 1 to 4. The FRP pin 60 (again symmetrical about its center) has a pair of molded inserts 62 affixed in place to provide male thread profiles. The inserts 62, as will be described, may be fiber-reinforced or not. They are bounded in the central region by oppositely inclined conical sealing ring tapers 64, and at the nose ends by a tapered sealing ring 66, the angles of which may be the same as in the example of FIGS. 1–4.

In the central transverse plane, a radial sealing ring 68 engages the end faces of first and second boxes 70, 72 respectively. An end shoulder 74 at the inner end of the boxes engages the adjacent nose end of the pin 60 through a radial seal ring 76 which may be of steel, an elastomer, or a layered laminate.

In FIG. 5, the wall thicknesses of the boxes 70, 72 are increased, to accommodate the end shoulder 74 that is at the inner end of the threaded region of the box. An added difference is in the use of the separate pre-molded threaded inserts 62 that are adhered to the pin 60. Using this approach, relatively high strength synthetic resin parts with male threads may be provided without filament winding or fiber reinforcement to engage threads on the opposing FRP body 70 or 72, although the remainder of the pin 60 is a filament wound structure. The insert 62 may be fitted onto the body 60 by splitting and rejoining the insert or body (not shown) by molding in place or by incorporating the conical gradient section in the insert. While an insert without fiber reinforcement (or with random fiber orientations) has lesser properties than achievable when continuous filaments are incorporated, as in a female thread structure, the net result is satisfactory for many purposes because the principal body is fiber-reinforced plastic.

On the other hand, because the inserts can be relatively small, filament winding steps can be carried out to provide male threads. As on example, impregnated filaments can be wound in thin layers on a male mold, and outer thread profiles can be precisely shaped by encompassing in a split female mold or threading into a female member for curing. The inner surface of this shell can then be filled to provide a conical inner diameter of the shape shown.

Figure 6:
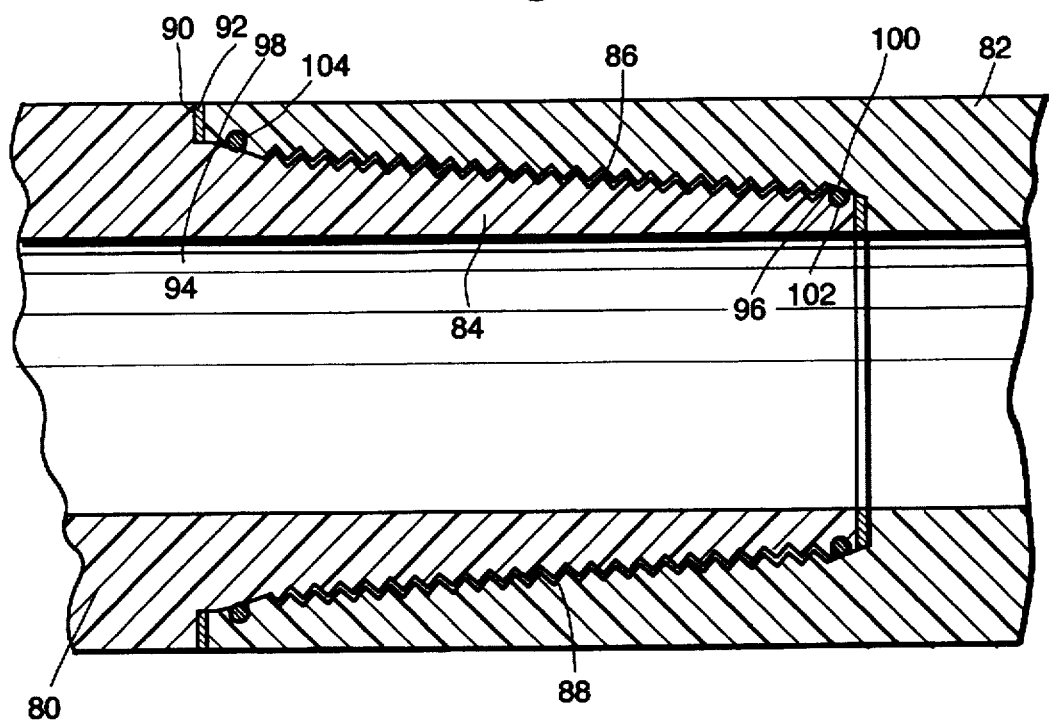
FIG. 6 is a side sectional view of a connection using direct engagement of tubular FRP members, one of which has a metal threaded insert forming male threads.

FIG. 6 depicts a combination in which connections may be made directly between a first box 80 having male threads and a second box 82 having female threads. This combination, also of substantial wall thickness or of upset construction, uses cut male threads 84 in the male member 80, but superimposes a metal threaded sleeve insert 86 against which the female threads 88 of the second box 82 may be engaged without surface incompatibility, while retaining significant male thread strength. The steel insert 86 may be locked against circumferential movement by radial pins or a longitudinal slot (not shown) to permit repeated make and break operations. The nose ends of the boxes 80, 82 do not seat directly on shoulders 90 of the other element, but engage radial rings 92 that are transverse to the central axis. The rings 92 may be loose or attached to one or the other of the elements. The first box 80 includes conical gradient rings 94, 96 adjacent the nose end and inner end respectively.

In the arrangement of FIG. 6, the boxes are shown to be of substantially constant outer diameter, and the thread tapers are angled relative to the axial length of the tubular goods, with the conical gradient rings 94, 96 angled relative to the angles of thread tapers at the larger and nose ends respectively of the first box 80. The second box 82 likewise has complementary conical rings 98, 100 adjacent its nose end and inner end respectively. O-rings 102, 104 are mounted in grooves in the nose end sealing ring sections of the first box 80 and second box 82 respectively. The box-to-box connection of FIG. 6 provides sealing and stress equalization as previously described, with the capability for repeated makeup and breakout. The tensile stress which the connection will accept is determined by wall thickness in the threaded region.

Although a number of different forms and modifications in accordance with the invention have been described, it will be appreciated that the invention is not limited thereto, but encompasses all modifications and alternatives within the scope of the appended claims.

What is claimed is:

1. A coupling for threaded tubular goods for high pressure applications, comprising:

a pair of female tubular members having internal threaded regions adjacent their ends; and a male pin member having a pair of tapered threaded regions extending oppositely from a central portion thereof, each of the tubular members and the pin member having a pair of unthreaded conical ring surfaces, one on each side of each of the threaded regions therein, the conical ring surfaces being opposed and in mating relation when the tubular members and the pin member are engaged and the conical ring surfaces being angled relative to the taper of the threaded region to engage with increasing force as the thread engagement increases.

2. A coupling as set forth in claim 1, wherein the tubular members have diverging terminal portions including internal threaded regions, and wherein the pin member further includes O-ring members circumferentially disposed about the pin adjacent each end thereof in the conical ring surface for engagement with the mating conical ring surface of the associated tubular member.

3. A coupling as set forth in claim 2, wherein the mating conical surfaces have tapers with angles of 2° to 20° relative to the taper of the threaded regions of the male pin member.

4. A coupling as set forth in claim 3, wherein the pin member has a central crest region with tapered sides defining central region sealing surfaces, and the female tubular members have end surfaces transverse to the coupling axis and wherein the coupling further includes a radial ring disposed about the central crest region of the pin member, and in engagement with the transverse end surfaces of the female tubular members.

5. A coupling as set forth in claim 4 above, wherein the female tubular members comprise fiber reinforced plastic members and wherein the male pin member is of metal.

6. A coupling as set forth in claim 5 above, wherein the fiber reinforced plastic members comprise continuous wound filament reinforcement and the radial ring is of metal.

7. A coupling as set forth in claim 1 above, wherein the male pin member is at least principally of fiber reinforced plastic.

8. A coupling as set forth in claim 7 above, wherein the male member includes a male thread insert.

9. A threaded connection utilizing a combination of fiber reinforced plastic female members and a double-ended male connecting member, comprising the combination of:

a pair of female members having internal threaded regions;

a single double-ended male member having a pair of oppositely extending threaded regions for receiving the female members in mating relation, and a means for providing a stress gradient disposed in the members adjacent each opposite end of each threaded region.

10. A threaded connection as set forth in claim 9, wherein the means for providing a stress gradient comprises mating conical surfaces on the female member and the male member adjacent each end of the threaded regions, the conical surfaces diverging in the direction from each end of the male members toward the center thereof.

11. A threaded connection as set forth in claim 10, wherein the male member has a selected outer taper in the threaded region and the threads are principally of uniform depth relative to the outer taper, wherein the conical surfaces adjacent the ends of the male member are in the range of 5° to 20° relative to the outer taper angle and the conical surfaces adjacent the central region of the male member are in the range of 2° to 10° relative to the outer taper angle, and wherein the conical surfaces on the female members have angles substantially matching the opposed conical surfaces on the male member.

12. A threaded connection as set forth in claim 11, wherein the male member includes an O-ring disposed within each conical surface adjacent an end of the male member, and wherein the male member further includes a separate relief groove between the inner end of each threaded region and each closest conical surface adjacent the central region of the male member.

13. A threaded connection as set forth in claim 10 above, wherein the conical surfaces in the central region of the male member are at an angle of approximately 5° relative to the adjacent thread taper and wherein the conical surfaces adjacent the end of the male member are at an angle of approximately 10° relative to the adjacent thread taper.

14. A threaded connection as set forth in claim 10 above, wherein the exterior diameter of each female member diverges in the direction toward the end thereof.

15. A threaded connection comprising:
 a double ended metal male member having a threaded region with a predetermined thread taper of opposite angle on each side of a central region, the male member including conical tapered bearing surfaces adjacent each end of each threaded region and angled acutely in excess of 2° relative to the thread taper; and
 a pair of female FRP members having threaded regions, each of which is in mating relation individually with a different threaded region of the male member, and tapered bearing surfaces engaging those of the male member when the threaded regions are in engagement.

16. A threaded connection comprising:
 a double ended metal male member having a pair of threaded regions, each with a predetermined thread taper of opposite angle on a different side of a central region, the male member including conical tapered bearing surfaces adjacent each end of each threaded region and angled with selected angles relative to the thread taper;
 a pair of female FRP members having threaded regions mating individually with the different threaded regions of the male member, tapered bearing surfaces engaging those of the male member and facing ends when engaged on the male member; and
 wherein, the makeup torque is distributed between the threaded regions and the bearing surfaces such that at least one-third of the torque is absorbed in each of the bearing surfaces at full makeup, and wherein the connection further includes a radial ring disposed between and in engagement with the facing ends of the female members, and under a compressive loading in excess of 5,000 psi when the connection is fully made up.

17. A threaded connection as set forth in claim 16, wherein the male member has a substantially constant inner diameter and the conical bearing surfaces adjacent the central region diverge in the direction toward the center of the male member, being spaced apart by a central flat of maximum diameter, and wherein the radial ring is of material dissimilar to the female members, the female members each having appreciable wall thickness at the end thereof and comprising a filament wound reinforcement with circumferential and axial filament orientations therein.

18. A threaded connection as set forth in claim 17, wherein the male member is of the class of materials comprising corrosion-resistant metals such as Inconel, chrome, stainless steel, coated steel, and API corrosion resistant metals including 9 chrome, 11 chrome, 13 chrome, 17 chrome and 2205 chrome (22% chrome and 5% nickel) and wherein the female members are fiber-reinforced composites in which the matrices are of the class consisting of epoxy, vinyl esters, poly esters, Furan or mixtures thereof, and wherein the filaments are of the class comprising glass fibers and carbon and graphite fibers and Kevlar and boron.

19. A threaded connection as set forth in claim 17 above, wherein the connection further comprises an O-ring disposed between the conical tapered bearing surfaces adjacent the ends of the male member and the opposed conical bearing surfaces of the female members, and wherein the conical tapered bearing surfaces on the female members engaging the O-ring taper to an inner diameter matching that of the male member.

20. A threaded connection as set forth in claim 19 above, wherein the distribution of total torque at full makeup is proportioned such that, for exemplary 2⅞ tubing, with a total torque of approximately 1,250 ft. lbs. the torque absorbed at the bearing surfaces about 500 ft. lbs.

21. A double-ended male member for interconnecting a pair of FRP tubular members comprising:
 a metal body having a substantially constant inner diameter and a pair of inwardly diverging male threaded regions on opposite sides of a central region;
 two pairs of stress gradient tapers on the male member, each one of the stress gradient tapers being disposed adjacent an opposite end of a different one of the threaded regions;
 the stress gradient tapers comprising conical surfaces having selected angles diverging at greater angles than the tapers of the threaded regions; and
 an O-ring disposed adjacent each different end of the male member in the conical surface thereat.

22. A double-ended male member as set forth in claim 21 and having spaced apart nose ends, wherein the outer conical tapers disposed adjacent the nose ends of the male member have tapers in the range of 5° to 20° relative to the taper of the threaded region and the inner conical tapers have tapers in the range of 2° to 10° relative to the taper of the threaded region.

23. A double-ended male member as set forth in claim 22, wherein the conical tapers adjacent the central region define a central crest region including a central flat of maximum diameter, and wherein the male member further includes relief grooves disposed between the inner end of each threaded region and the central crest region.

24. A threaded fiber reinforced plastic tubular product for high tensile and high pressure applications, comprising:
 a tubular walled body of fiber reinforced plastic, the fiber reinforcement comprising wound filament reinforcement having both axial and circumferential components;
 the tubular walled body including a diverging end portion of substantial thickness having an interior diverging threaded region including filament reinforcement and having a predetermined inner thread taper, the body terminating in a transverse end surface; and
 the body further including conical stress gradient surfaces adjacent each end of the threaded region, one conical surface being adjacent the end surface of the tubular body and at an angle of 2° to 10° relative to the inner thread taper, and the other conical surface being interior to the tubular member and at an angle of 5° to 20° relative to the inner thread taper.

25. A threaded fiber reinforced plastic tubular product as set forth in claim 24 above, wherein the plastic is chosen from the material comprising epoxies, vinyl esters, poly esters, Furan or mixtures thereof, and wherein the filaments are chosen from the class comprising fiberglass, carbon and graphite filament and Kevlar and boron.

26. A connection for two tubular FRP products comprising:
   a first tubular element of FRP composite material having an end length with an interior female thread region, and including a pair of conical gradient surfaces, one on each side of the thread region, and
   a second tubular element of FRP composite material having an end length with an exterior male thread region, and including a pair of conical gradient surfaces, one on each side of the thread region, the male thread region and conical gradient surfaces mating with the thread region and conical gradient surfaces on the first tubular element and having angles relative to the thread region of torque to provide stress absorption at the regions of the conical gradient surfaces when the tubular elements are fully engaged.

27. A connection as set forth in claim 26 above, wherein the first tubular element includes an inner shoulder adjacent the inner conical gradient surface of the first tubular element and the second tubular element includes an outer shoulder adjacent the said inner conical gradient surface, the ends of the first and second tubular elements abutting the shoulders of the other element when the tubular elements are fully engaged, an O-ring disposed in each of the conical gradient surfaces, and a pair of seal rings, each disposed between an end of one tubular element and the opposing shoulder of the other element.

28. A connection as set forth in claim 26 above, further including a threaded steel insert interposed in the thread region between the male and female threads.

29. A connection for threaded tubular products utilizing fiber reinforced plastic bodies comprising:
   a pair of FRP tubular members having female threads adjacent the ends therefore and including filament wound reinforcement;
   a double-ended pin joining the tubular members and having a body of substantially fiber-reinforced plastic;
   a pair of spaced apart threaded inserts mounted on the pin, the inserts having separate thread regions thereon each mating separately with the threads of a different tubular member, and the tubular members and pin each including conical gradient surfaces on opposite sides of the thread regions, the conical gradient surfaces being complementary and engaging when the threaded regions are made up.

30. A connection as set forth in claim 29 above, wherein the connection further includes an O-ring disposed in the conical gradient surfaces at the outer ends of the pin, and a central seal ring disposed about the central region of the pin and engaging the facing ends of the tubular members.

31. A connection as set forth in claim 30 above, wherein the inserts are molded synthetic elements having exterior male threads.

32. A connection as set forth in claim 30 above, wherein the inserts include filament wound reinforcement in the exterior male threads.

33. A connection for threaded tubular goods at least one of which is principally of FRP material comprising:
   a first tubular body having an FRP body and a female thread region, and including a pair of conical gradient sections, one on each side of the thread region; and
   a second tubular body having a male thread region and including a pair of conical gradient sections, one on each side of the male thread region, the female and male thread regions and conical gradient sections mating when the tubular bodies are in full engagement, the length, diameter and taper of the conical gradient sections being chosen to provide interference sufficient to reduce deformation in the regions of the bodies adjacent to the thread region on full engagement.

34. A connection as set forth in claim 33 above, further including an O-ring disposed within at least one of the conical gradient sections.

35. A connection as set forth in claim 34 above, wherein the second tubular body is a metal member.

36. A connection as set forth in claim 34 above, wherein the second tubular body is at least principally of FRP material.

37. A connection as set forth in claim 34 above, wherein the second tubular body is an FRP member and both tubular bodies have like inner and outer diameters.

* * * * *